(12) United States Patent
Chen et al.

US008463873B2

(10) Patent No.: US 8,463,873 B2
(45) Date of Patent: Jun. 11, 2013

(54) STREAMING CLIENT SYSTEM BASE IMAGES

(75) Inventors: Liang Chen, Raleigh, NC (US); Jonathan G. Knox, Morrisville, NC (US); Yi Zhou, Raleigh, NC (US); Rod D. Waltermann, Rougemont, NC (US); Nathan J. Peterson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 558 days.

(21) Appl. No.: 12/750,322

(22) Filed: Mar. 30, 2010

(65) Prior Publication Data

US 2011/0246613 A1  Oct. 6, 2011

(51) Int. Cl.
*G06F 15/173* (2006.01)
(52) U.S. Cl.
USPC .......................................... 709/219

(58) Field of Classification Search
USPC ........................................................ 709/219
See application file for complete search history.

(56) References Cited

U.S. PATENT DOCUMENTS

| 5,765,195 | A  | * | 6/1998 | McDonald .................... 711/141 |
| 7,272,687 | B2 | * | 9/2007 | Balasubramanian ......... 711/114 |
| 7,523,319 | B2 | * | 4/2009 | Challener et al. ............. 713/188 |
| 7,752,386 | B1 | * | 7/2010 | Aral et al. ..................... 711/113 |
| 8,095,764 | B1 | * | 1/2012 | Bauer et al. ................... 711/170 |
| 8,151,102 | B2 | * | 4/2012 | Itoh .................................. 713/2 |
| 8,266,273 | B2 | * | 9/2012 | Hanking ....................... 709/224 |
| 8,285,821 | B2 | * | 10/2012 | Challener et al. ............. 709/220 |

* cited by examiner

*Primary Examiner* — David Eng
(74) *Attorney, Agent, or Firm* — Ference & Associates LLC

(57) ABSTRACT

Embodiments provide systems, methods, apparatuses and computer program products configured to provide alternative desktop computing solutions. Embodiments generally provide client devices configured to utilize one of a local base image and a base image stored remotely, with a user-specific overlay image remotely storing user specific data. The clients are configured to download and store the base image locally.

20 Claims, 9 Drawing Sheets

STREAMING CLIENT SYSTEM BASE IMAGES

BACKGROUND

The subject matter presented herein generally relates to alternative desktop computing solutions. More particularly, the subject matter relates to centrally managed personal computer (PC) systems networked to one or more storage devices, such as a storage area network (SAN) device.

Businesses are continually concerned with cost savings and security. In the realm of IT costs, businesses are increasingly concerned with the need to reduce the costs of maintaining enterprise PCs. Moreover, businesses seek safe, secure solutions that save money without sacrificing performance. In an effort to meet such needs, various PC manufacturers have introduced thin client focused solutions, so called because the thin client relies in some regard on one or more other computer systems (for example, a SAN) in order to provide traditional PC functionality. Among other features, a thin client focused solution allows for central management and increased security. One such approach has been to virtualize the clients, relying heavily on back end servers. Another approach is the Secure Managed Client (SMC) of Lenovo.

As an example of an alternative desktop-operating environment, Lenovo's Secure Managed Client (SMC) provides centrally managed PCs. In one implementation, SMC utilizes a ThinkCentre® client with an INTEL® VT Processor, iSCSI (Internet Small Computer System Interface) protocol, a co-developed software stack and Lenovo Storage Array Appliance powered by INTEL®. Although SMC offers all the benefits and functionality of a thin client solution, SMC avoids sacrificing important features such as application compatibility, graphics performance, the number of desktop options available, and the like. By leveraging centralized client management, SMC makes it easier to manage and provision users and images, minimize total cost of ownership, et cetera. This is largely due to the fact that SMC eliminates the need for desk side support and lowers costs, for example costs associated with installation, change, deployment and energy consumption.

The inventors have recognized, however, that there may be certain improvements in the SMC operating environment.

BRIEF SUMMARY

In summary, one aspect provides an apparatus comprising: one or more processors; a network interface configured to access over a network one or more of a base image and a user overlay image stored on a remote storage device; and a hard disk; wherein, responsive to execution of computer readable program code accessible to the one or more processors, the one or more processors are configured to: ascertain if the hard disk has been provisioned for use as a client local cache; and subsequent to a determination that the hard disk has been provisioned for use as a client local cache, download the base image from the remote storage device.

Another aspect provides a method comprising: in an apparatus configured to access one or more of a base image and a user overlay image stored on a remote storage device, ascertaining if a hard disk of the apparatus has been provisioned for use as a client local cache; and subsequent to a determination that the hard disk has been provisioned for use as a client local cache, downloading a base image from the remote storage device.

A further aspect provides a computer program product comprising: a computer readable storage medium having a program of instructions embodied therewith for permitting an apparatus to access one or more of a base image and a user overlay image stored on a remote storage device, the program of instructions further comprising: computer readable program code configured to ascertain if a hard disk of the apparatus has been provisioned for use as a client local cache; and subsequent to a determination that the hard disk has been provisioned for use as a client local cache, download a base image from the remote storage device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
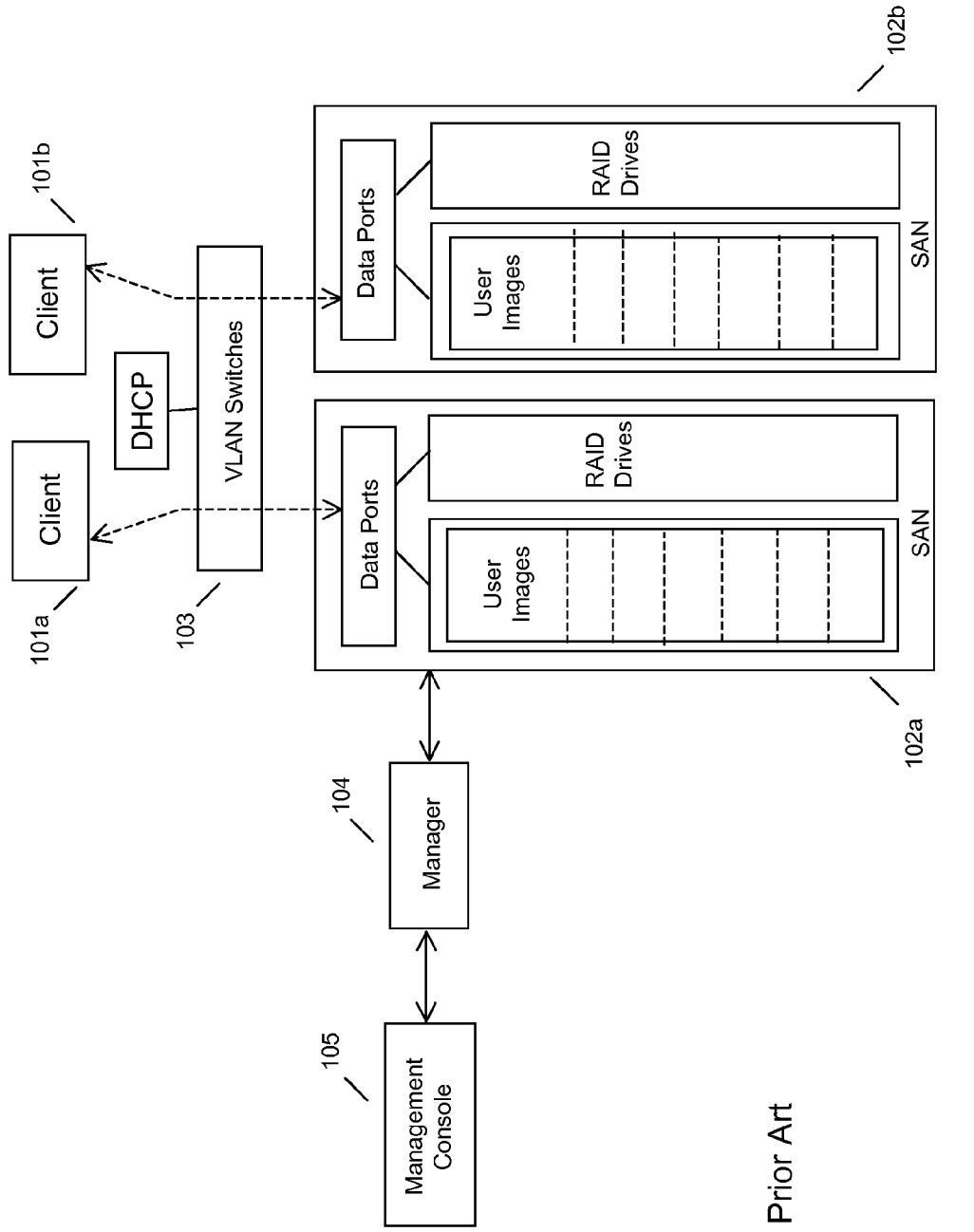
FIG. 1 illustrates an alternative desktop operating environment.

It will be readily understood that the components of the embodiments, as generally described and illustrated in the figures herein, may be arranged and designed in a wide variety of different configurations in addition to the described embodiments. Thus, the following more detailed description of the embodiments, as represented in the figures, is not intended to limit the scope of the claims, but is merely representative of those embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Embodiments of the invention provide systems, methods, apparatuses and computer program products configured to provide alternative desktop computing solutions. Embodiments of the invention generally provide client devices configured to stream down a common base image to local storage while accessing in parallel the base image from a remote storage device. The clients are configured to store user specific data remotely on a user-specific overlay image.

The illustrated embodiments will be best understood by reference to the figures. The following description is intended only by way of example, and simply illustrates certain embodiments.

The operation of diskless clients used in a Secure Managed Client (SMC) operating environment are such as those described in co-pending and commonly assigned U.S. patent application Ser. No. 11/693,515, entitled "DISKLESS CLIENT USING A HYPERVISOR", filed Mar. 29, 2007 and incorporated by reference herein. As described therein, a hypervisor is employed in a diskless client system to more efficiently facilitate and greatly expand the booting capabilities of an operating system (OS). More particularly, the hypervisor preferably "traps" all disk and LAN accesses from the OS.

Expressed another way, to the extent that many OSs are normally configured to write to a local hard drive during a boot, and to the extent one may wish to incorporate such an OS into a diskless system, a hypervisor in accordance with co-pending and commonly assigned U.S. patent application Ser. No. 11/693,515, entitled "DISKLESS CLIENT USING A HYPERVISOR", filed Mar. 29, 2007, obviates the need to expensively reconfigure the OS for a diskless environment in which the booting context will be significantly different. Any and all translation to remote storage can be performed by the hypervisor and thus essentially "blind" to the OS.

FIG. 1 illustrates a high level SMC operating environment. SMC uses high-performance network infrastructure connecting clients 101*a*, 101*b* and back-end devices (for example, SAN devices 102*a*, 102*b*). One implementation uses 1 Gigabit Ethernet switches 103 with Virtual LANs.

A manager 104 is a centralized device (server) provided for managing and maintaining the SMC system. The manager 104 can be used for example to handle user authentication from a client (for example, client 101*a*). The client 101*a*, for example, a Lenovo ThinkCentre® M58P Ultra Small Form Factor (USFF) desktop PC with INTEL® vPro™ technology, is configured for DHCP dynamic address allocation and uses a DHCP server's boot-path option to make iSCSI (Internet Small Computer System Interface) connections to the SAN 102*a*, which will boot a common user logon screen.

At login, the user's credentials are sent to the client connection web service, which authenticates the user and returns the information needed to boot the client 101*a* to the User OS on the SAN 102*a*. Thus, the diskless client makes an iSCSI connection to SAN 102*a* and boots the user image. The manager 104 can be configured to auto-generate the iSCSI logon information, including passwords, in the background and pass information securely to a client 101*a*. For increased security, the user does not need to know passwords used for low-level access to the user image.

The SAN 102*a* is a device at which a client's 101*a* data is securely stored. SAN 102*a* includes an INTEL® iSCSI SAN with specialized software, configured with RAID disks and GB Ethernet ports. The SAN 102*a* can be managed and provisioned remotely through a Management Console 105. The Management Console 105 can be configured to generate user accounts and passwords used to access the SAN 102*a*.

Figure 2:
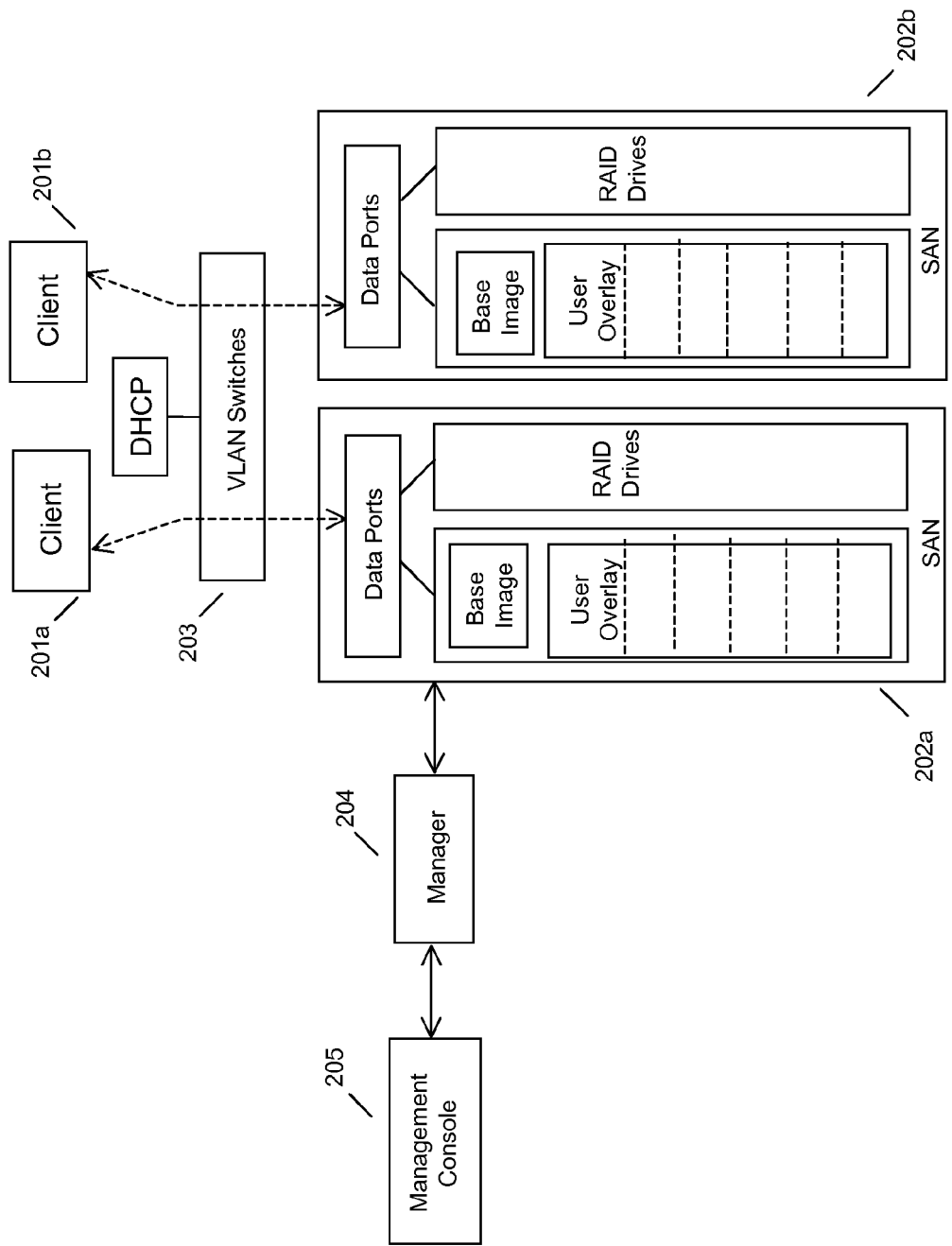
FIG. 2 illustrates an alternative desktop operating environment.

Referring now to FIG. 2, a high level example of another SMC operating environment is illustrated. Like the SMC operating environment illustrated in FIG. 1, the SMC operating environment illustrated in FIG. 2 uses high-performance network infrastructure connecting clients 201*a*, 201*b* and back-end devices (for example, SAN devices 202*a*, 202*b*). One implementation uses 1-Gigabit Ethernet switches 203 with Virtual LANs. The manager 204 can be configured to auto-generate the iSCSI logon information, including passwords, in the background and pass information securely to a client 201*a*.

The SAN 202*a* is again a device at which a client's 201*a* data is securely stored. A SAN 202*a* includes an INTEL® iSCSI SAN with specialized software, configured with RAID disks and GB Ethernet ports. The SAN 202*a* can be managed and provisioned remotely through a Management Console 205. The Management Console 205 can be configured to generate user accounts and passwords used to access the SAN 202*a*.

Unlike the SMC operating environment illustrated in FIG. 1, however, the SAN devices 202*a*, 202*b* in FIG. 2 include 1) a base image of a disk containing an operating system and 2) a user overlay image. The base image of the operating system is accessible to and utilized by all users of the SAN device (for example, 202*a*). Any modifications to the base image by individual users are implemented through the use of a user overlay. This overlay is preferably not accessible to all users and indicates what changes a particular user has made to the base image. For example, this is accomplished by recording those sectors of the base image that contain data changed by the user. This may be through the use of a look-up table. The sector containing the changed data is also preferably stored in the user overlay.

A hypervisor installed in a client (for example, 201*a*) loads the look-up table containing information on those sectors of the base image that have been changed by the user. When information on a particular sector is called for by software running on client 201*a*, the hypervisor decides whether to obtain the sector from the common base image stored on SAN 202*a* or the user overlay stored on SAN 202*a*.

Minimizing Set-Up Time During First Boot

Conventionally, for example in the context of a diskless client, there were multiple methods that could be used to deploy a user OS in an SMC environment. A standard PC image (for example, the same image used to pre-load a client (for example, a Lenovo ThinkCentre® or ThinkPad®)) was used as a template to create virtual user hard drives for each user of the image. The user image could be uploaded for example through a provided utility or by mounting the user image (using an iSCSI initiator) and then copying the user image up to the SAN 102*a*.

Generally, the SMC platform supported images may be created using a number of different methods, including using Windows® standard install CDs, using Windows® imaging tools such as System Preparation (sysprep), and Lenovo imaging tools such as ImageUltra Builder. Whatever was used to create the user image, the user image was generalized, for example, using the general pass feature of sysprep. In such an action, specific information relevant to the machine used to create the user image is removed from the system as part of the image creation process. Examples of the type of information removed from the operating system in the generalization process include the name of the computer, installed device drivers, and the like. On the first boot of the user image from the SAN drive, this information would be reinserted or reinstalled into the operating system (user overlay). Such reinstallation may be dependent upon the hardware configuration of the client (for example, 101a).

Booting of clients 101a, 101b could be accelerated using a boot acceleration procedure or a faster network. Conventionally, boot acceleration has been accomplished by optimizing a SAN cache. The SAN cache reduced the number of disk-seeks and disk-reads needed in the boot cycle. The SAN cache worked most efficiently when most clients 101a, 101b connected to the SAN used the same image. For instance, if most of the volumes on a SAN are Windows® Vista OS, but a few are Windows® XP OS, the SAN cache would be optimized for Windows® Vista OS. Each SAN had its own cache policy to bunch similar OSs to attain the maximum boot acceleration.

When an image of the operating system is split into a common base image and a user overlay in accordance with an embodiment (as illustrated in FIG. 2), the inventors have recognized that after the base image and user overlay are deployed, many common OS files reside on the overlay image. This increases the size of the overlay image and also increases the amount of time required for the initial or first boot of the OS, as various device drivers, et cetera, are installed depending upon the hardware configuration of the client (for example, 201a). Accordingly, embodiments utilize conventional imaging tools in a non-traditional image creation process to accelerate booting and reduce the size of the user overlay.

Figures 3A, 3B:
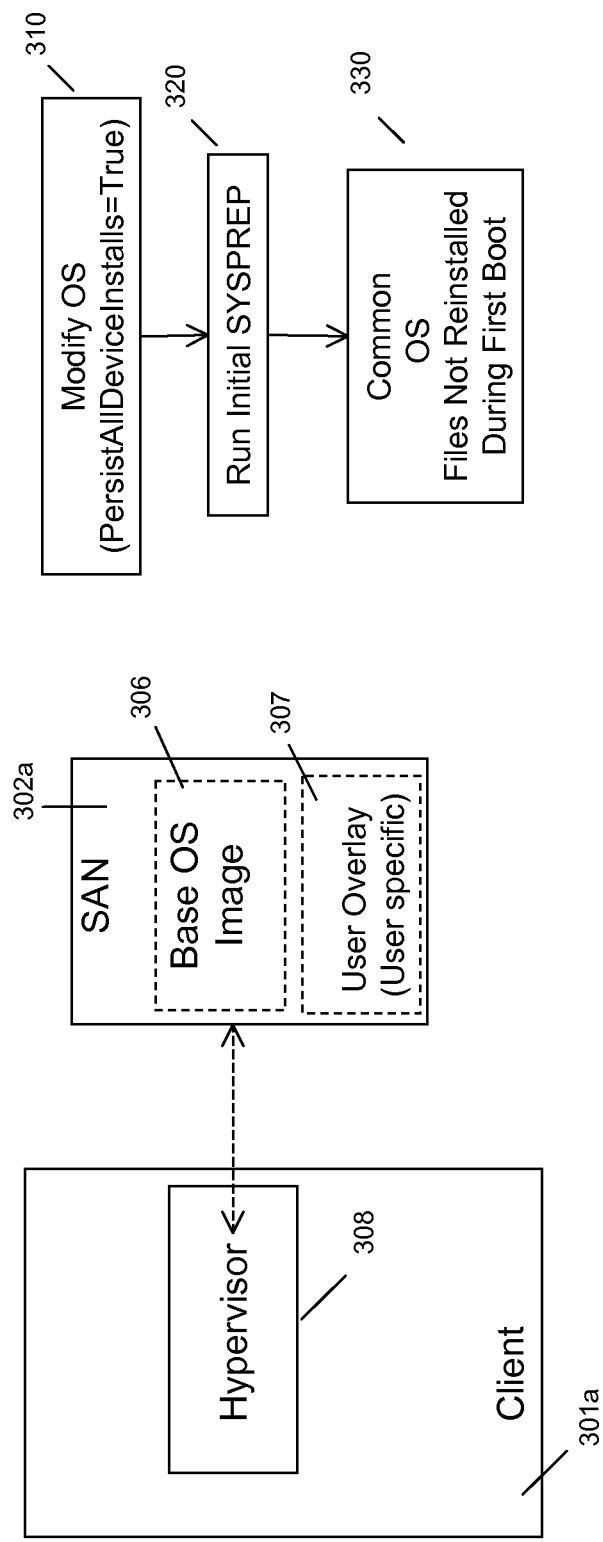
FIGS. 3A and 3B illustrate a modified OS and client device.

As illustrated in FIGS. 3A, 3B, to modify the OS image in such a way, an embodiment modifies image generation by leveraging existing image generation tools (such as Sysprep) to reduce the number of common OS files that are reinstalled during first boot. This reduces the OS setup time and increases the amount of common OS files. To speed booting, these common OS files can particularly include files that are commonly uninstalled from the base image when the image is generalized using the imaging utility (for example, sysprep/generalize) and which are then reinstalled during the first boot of the image installed on a client computer. For example, the common OS files may include standard device drivers know to be included on a common client 301a.

An example of an OS image setup is illustrated in FIG. 3B. In an embodiment, the PersistAllDeviceInstalls setting is changed to true 310 using the x86_Microsoft-Windows-pnp-Sysprep-neutral image component. The Microsoft-Windows-PnpSysprep component specifies whether all Plug and Play information persists during the generalized pass. Typically, during the generalized pass all device information is removed from the computer. If the device information is removed during the generalized pass, the next time the computer runs Pug and Play, the devices will be re-initialized. Typically, the next time the computer boots, the specialize pass runs, and Plug and Play runs. This ensures that when the generalize pass of Sysprep is run 320, common OS files are not uninstalled (are skipped) 330.

Referring back to FIG. 3A, these common OS files are then provided in the base image 306 on the SAN 302a. All installed common OS files (for example, device drivers) will then not be uninstalled during the generalize pass, which forces these common OS files to reside in the base image 306. This works best when clients have the same hardware configuration, as is typically the case when an organization deploys an SMC computing environment.

SAN 302a is shown with a common base image 306 and user overlay 307. Hypervisor 308 on client 301a controls whether disk sector reads are pulled from the common base image 306 or user overlay 307. As described herein, when changes to the base image 306 are made, the disk sector on which the changed data resides is stored in user overlay 307. A look up table may also be maintained in user overlay 307, such lookup table being loaded into the hypervisor upon booting. This lookup table is used by the hypervisor to keep track of what disk sectors are stored in the user overlay 307.

Disk Provisioning

Figure 4:
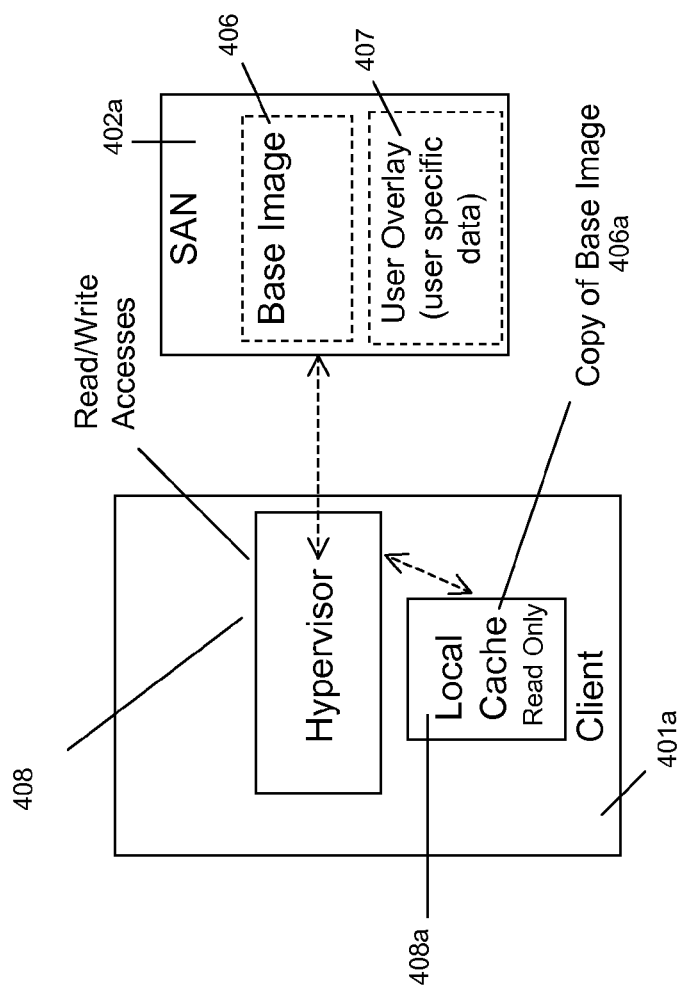
FIG. 4 illustrates an example of disk provisioning.

As illustrated in FIG. 4, a client 401a can be provisioned with a copy of the base image 406a in a read-only local cache 408a (for example, a flash memory device or hard disk drive (HDD)). This local copy of the base image 408a permits further reduction of first boot (set up) time and decreased network traffic, as the local copy of the base image 408a can be accessed by the client 401a (via the hypervisor 408), rather than accessing the base image 406 stored on the SAN 402a. As discussed herein, all changes made by a particular user can be stored in the user overlay 407. It should be noted that local cache 408a may contain local copies of multiple base images. For example, one such base image may be of the Windows® XP OS, while a second such base image may be of the Windows® 7 OS. Alternatively, if the SMC operating environment is deployed where various users have various builds of a base image, such as a college or university (faculty/staff and student), one such base image may be a faculty/staff build while a second such base image may be a student build. In such circumstances, the local cache also includes an indication of what base images are available on the local cache. Any number of multiple base images may be used, limited only by hardware constraints (that is, image size and available disk space, as described further herein). Additional items may also be placed in a local cache, such as the hypervisor boot code itself. In all such instances, the hypervisor is utilized to keep track of which base image is to be utilized by any given user.

Figure 5:
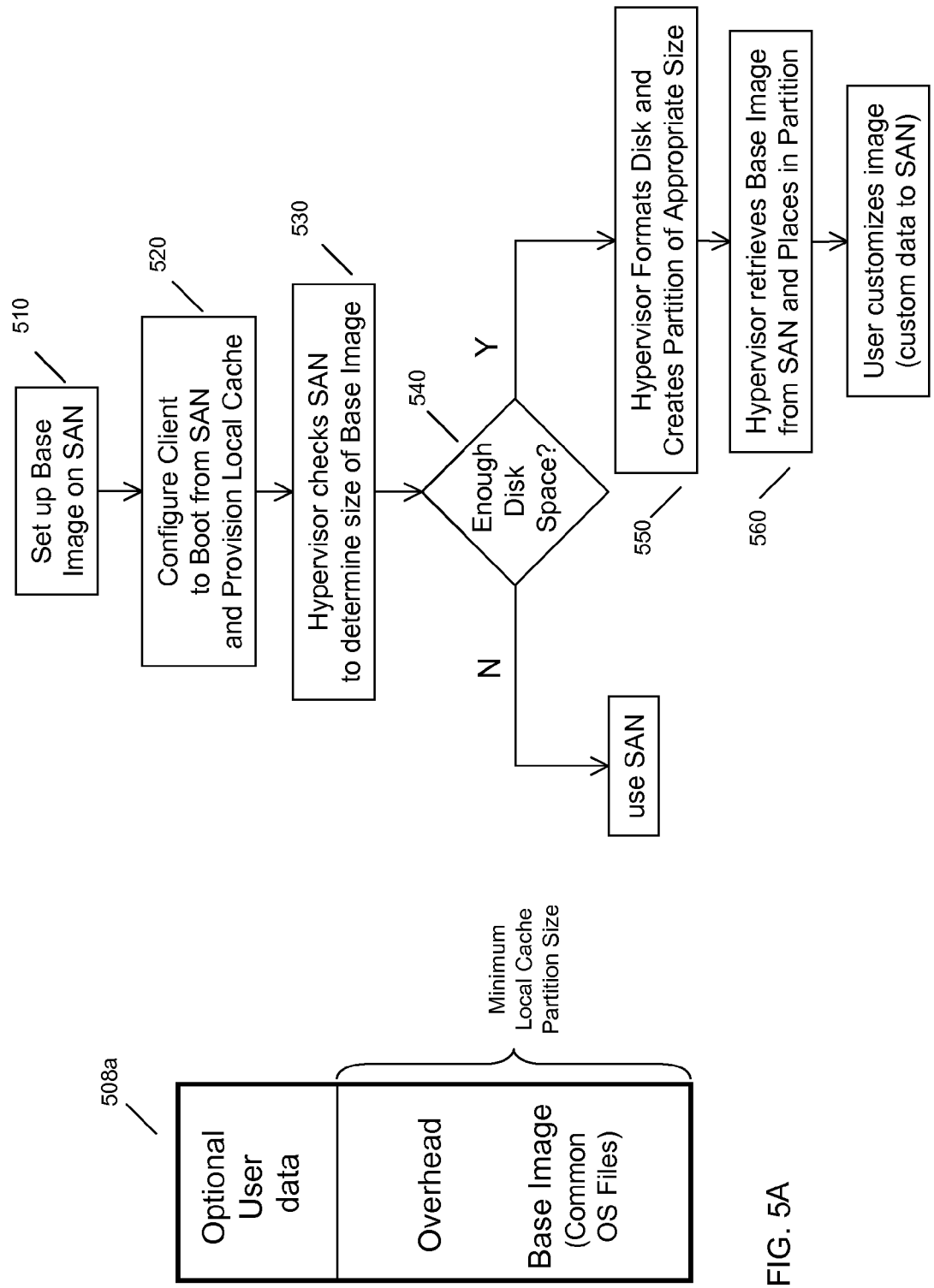
FIGS. 5A and 5B illustrate a further example of disk provisioning.

In FIGS. 5A and 5B an example of disk provisioning is illustrated. To set up a client with a local cache 508a, a HDD of the client can be utilized. A local cache 508a will generally be a local storage device provisioned to include the base image (including common OS files, as discussed herein), overhead space, and an optional user space. One obstacle in provisioning clients is the fact that they can have different size HDDs; thus it can be difficult for an IT administrator to ensure heterogeneous clients will accept a given base image.

As illustrated in FIG. 5A, an embodiment provides methods to provision a client's local disk for use as a local cache 508a (with optional user storage) without the IT administrator knowing the client's local HDD size. Currently, to partition a disk, an IT administrator is required to know the size of the client's HDD and the desired partition sizes. These requirements are particularly exacerbated when there is a heterogeneous collection of clients (HDD sizes) managed as a single group. For example if an administrator is managing 100 client systems, they may contain HDDs that range in size from 80 GB to 1 TB. Essentially, the IT administrator's goal is to determine a disk layout that matches all of the client systems. Conventional solutions default to a percentage that does not account for the minimum image size requirements.

Thus, an embodiment allows a local cache 508a to be provisioned with a base image (and overheard), along with an optional space allocated to local storage of user data. When optional user space is included in the local cache, such user space may, for example, appear as a separate hard drive that the user may access once properly formatted, or appear as a separate partition visible to the user. For security reasons, a local cache 508a need only include space for a base image and overhead; thus, a minimum local cache partition size does not necessarily include the optional user space. When no optional user space is included in the local cache, the base image and overhead space are on a hard drive or partition which is not accessible to the user (that is, a hidden hard drive or hidden partition).

Referring now to FIG. 5B, an IT administrator configures a client for local cache by setting up a base image on the SAN 510. As in FIG. 5A, the IT administrator has the option to determine a percentage of local disk space not used by base image and overhead, if any, to be allocated for user data. Once a base image has been set up on the SAN, the client is configured by the administrator to boot from the SAN 520. The client's hypervisor checks the SAN to determine the size of the base image 530. If it is determined at 540 that the client has enough disk space for the given base image, overhead, (and optional user data), as configured by the IT administrator, the client's drive is then provisioned by the hypervisor formatting the disk, creating partition(s) of appropriate size 550 (for example using Fdisk in the privileged domain of RAM disk which stores the hypervisor), and retrieving the base image from the SAN 560. If the client does not have sufficient space, the client may boot and run from the SAN, as per conventional diskless client operation.

The disk can be provisioned for example by the client's hypervisor calculating the amount of space necessary for local cache (base image), plus overhead (and optional user data, if any). This amount of space is determined for example by using the size of base image on the SAN assigned to the user, the size of the memory allocated to the user's OS, and space needed for the boot files, plus updates (overhead). The following equation shows an example of how to calculate the required space:

> local cache partition size=(base image size)+2(user OS memory, that is, memory available to operating system)+(local boot files+overhead, that is, memory required for hypervisor, et cetera)+(IT administrator determined percentage of remaining local disk space to be used for local cache, if any).

The 2(user OS memory) term above is indicated to make room for page file, though other values (2.5x, et cetera) can be chosen. The local boot files correspond to SMC code. The overhead term corresponds to space kept for updates to local boot files (allowing fall back to last know good configuration) . The remaining local disk space may be allocated for local cache or optionally allocated for user data. The user space partition size is determined from the size of the memory allocated to the user's OS. The following equation shows how to calculate the required space:

> user space partition size=2(user OS memory)+(IT administrator determined percentage of remaining local disk space to be used for user space, if any).

When the base image has been downloaded from the SAN, the user can the proceed through the first boot process and, as above, all user specific data will be stored to the SAN (unless the IT administrator has decided to allow an area of the local disk for user data, in which case a partition (drive letter) can be available to the user). It will be understood that the most security conscious choice is to have 0% allocated for optional user data (forcing user specific data to the SAN). The space allocated, if any, for optional user data could have increased security, for example employing full disk encryption for this area of the drive, et cetera.

Streaming Down Base Image from SAN

An embodiment provides a method to image the local disk concurrently with the user running the image from the SAN. Conventionally, image deployment involved pre-loading at the customer site or during the manufacturing process. In most cases there is an additional end user image customization step (first boot process) that can involve a significant amount of time. This significant amount of time is wasted if the user must wait until customization completes to begin working.

Using a diskless client, when an SMC user logs in for the first time, the user's image is booted from the SAN. In the case of an SMC client having a local cache, as described according to embodiments herein, the user's base image can be booted from the SAN or from the local cache.

Nonetheless, even with a client provisioned for a local cache, the first time the local cache user logs in, the base image is unavailable locally because this requires a connection to the SAN for downloading the base image. Moreover, if another user logs into the same client and the other user's base image is different (for example, a different OS), the local cache will likewise not have the other user's base image available locally. Accordingly, an embodiment is configured to concurrently run a guest OS and stream down the particular user's base image from the SAN to the local cache as a background task. The hypervisor provided (in memory) has information available to it for both provisioning the disk (as described herein) and locating/streaming down the proper base image from the SAN.

Figure 6:
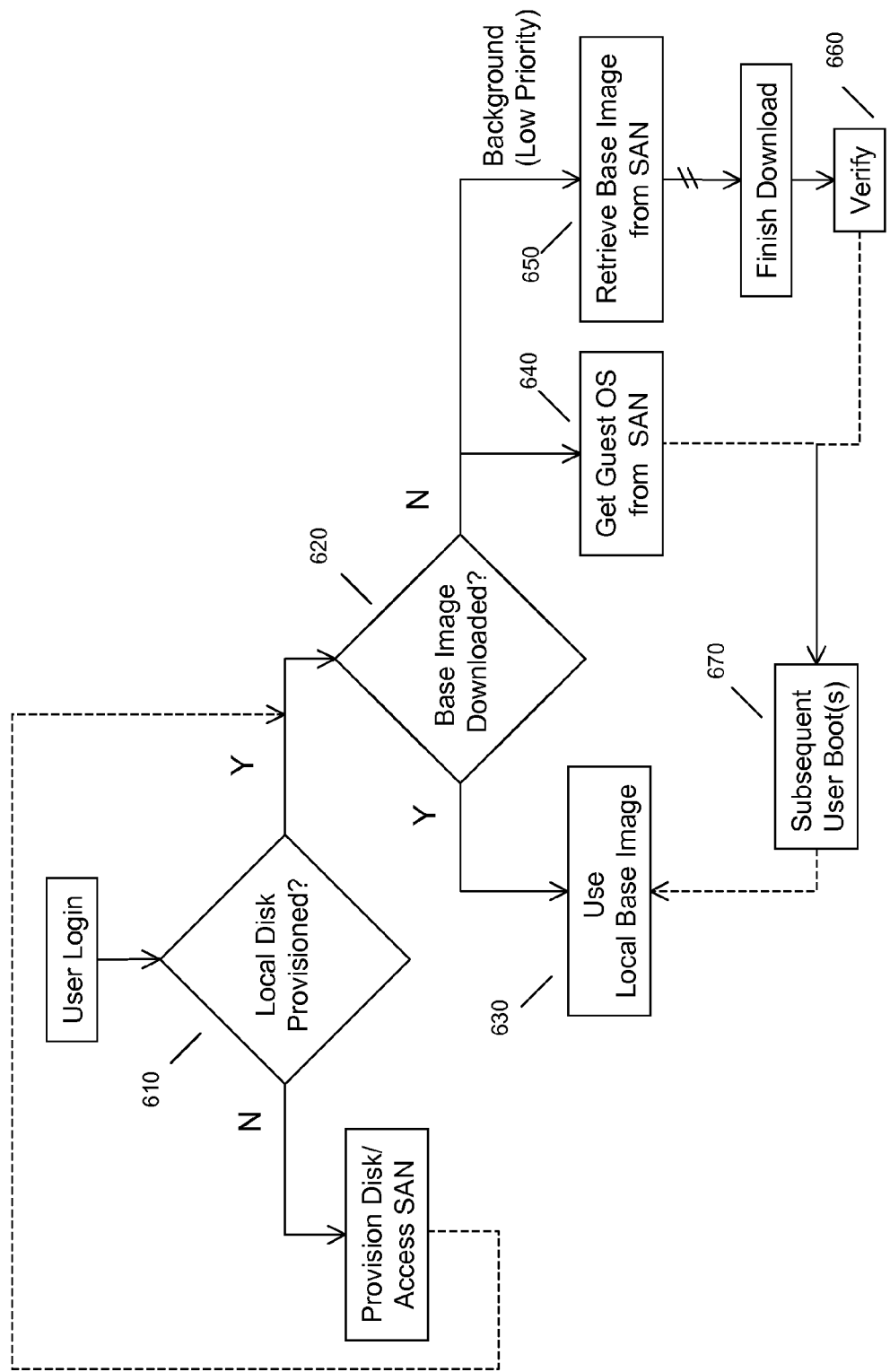
FIG. 6 illustrates an example of base image streaming.

Turning to FIG. 6, at user log-in, a check is made 610 if the local disk has been provisioned (as described herein). This check determines if the local disk has been formatted and the boot code installed. If not, the disk will first need to be provisioned. Next, a check is made 620 to detect if the base image needs to be downloaded (that is, it is determined if the base image is downloaded in the local cache). Assuming that the base image has not been downloaded, the logical unit number (LUN) that has the base image is connected to the client using information from the user overlay LUN. Then, a background process is started 650 to download the base image from the SAN to the local cache. This process is can be set to a low priority to allow a guest OS accessed from the SAN 640 to run smoothly. Thus, a user can continue utilizing the guest OS while the base image is streamed down from the SAN. The base image download process will automatically resume if interrupted (for example, the client is rebooted before the download completes). After the download completes, the base image is hashed to verify 660 it has been completely/correctly downloaded by matching the file size and hash value to the base image on the SAN. Thereafter, subsequent user boots 670 can proceed from the local copy of the base image, and periodic checks can be made for updates to the downloaded base image (by connecting to the SAN).

Migration from Native OS to SMC OS

In an alternative desktop use context, it is sometimes desirable for a user to keep his or her current (native) OS and simply migrate it up a remote device (SAN) for use. Unfortunately, certain OSs are not easy to migrate in this way. This is particularly the case for multi-partition OSs having interdependent partitions that tend to not be adequately updated upon migration. For example, when users want to migrate an existing multi-partition Windows® OS image such as Vista® or Windows® 7 OSs, these users can have boot issues when the partitions' assigned drive letters do not match after migration.

Today, a typical process for building a Windows® Vista® or Windows® 7 OS pre-load for a computer involves making several partitions, including system and OS partitions, then installing the boot loader and OS. Finally, the device drivers are configured, as are the applications for the new system.

In a diskless client with a virtualized HDD, the IT administrator is left with a few choices. The IT administrator can install the OS directly into the remote storage of the diskless system, and configure the OS; however, if the IT administrator wishes to migrate an existing pre-load from a system with a HDD, or if the OS has been used for a while by an end user, the IT administrator can run into boot issues when migrating the image to remote storage (SAN). This is due to registry and boot configuration data (BCD) entries not pointing to the correct partitions, even if they were faithfully copied for each partition using an existing image deployment tool such as Ghost and Microsoft® IMAGEX.

Figure 7:
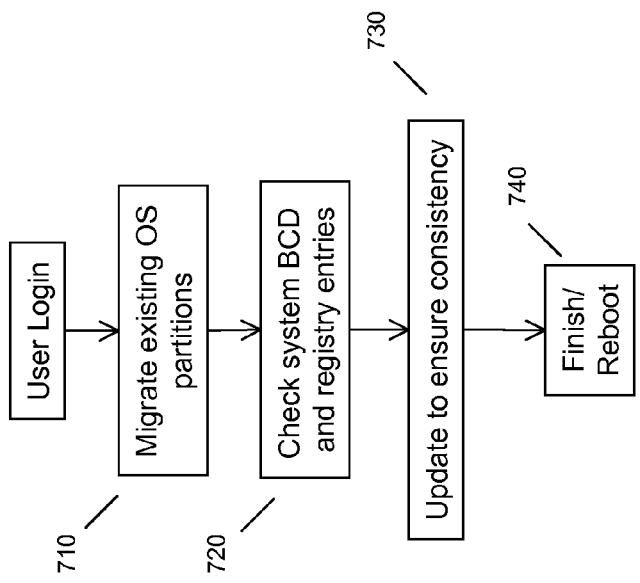
FIG. 7 illustrates an example of multi-partition OS migration.

Thus, as illustrated in FIG. 7, an embodiment provides a migration tool that automatically migrates (copies) a user's existing multi-partition OS up to the SAN database, checks the migrated OS for consistency problems, and fixes any detected problems automatically. An embodiment copies each partition of the preloaded client HDD to the virtual disk on the SAN for migration 710, including any partitioning and file system information. Next, the system BCD and registry entries are identified 720 for each mount device to determine the integrity of the boot profile. For example, the volume information (name and value) is determined for all the different partitions by checking the corresponding drive letters from HKLM\SYSTEM\MountedDevices entries. The results of the analysis are used to update/adjust 730 the BCD and registry entries to point to the correct mount device. For example, the volume information that is obtained is used to adjust HKLM\SYSTEM\MountedDevices entries for the target partitions. Also, "device" and "osdevice" entries in the BCD are adjusted to match the corresponding target partitions. Once complete, the client system can be rebooted 740 seamlessly to the virtualized (SAN) HDD, and is ready for the end user.

By providing such a migration operation, embodiments allow the flexibility of permitting users to have access to their existing, personalized operating environments without sacrificing security or central manageability.

Determining Boot Location

In an iSCSI environment using a diskless client, a user's OS is normally stored on a server (SAN) rather than on a local disk, though this remote server location is presented to the client as if it were the local disk. In such an iSCSI environment, most clients will contain a NIC card with an iSCSI option ROM. At boot time, this option ROM contains code to connect the client to the iSCSI server and present the iSCSI target location as a local drive on the client system. The client BIOS then boots this iSCSI drive (having a boot image) as if it were a local drive.

According to an embodiment, a client can be provisioned with a specialized ROM having a boot image for assisting in the boot process. The boot image stored locally will reduce the boot time (on the order of tens of seconds) because downloading a boot image from the SAN is avoided. This also reduces network traffic.

In this context, however, it is still important for the client to ascertain if boot code was obtained from the SAN (remotely) or locally, as the client will have to conduct certain additional processes if the client has booted locally. This is in part because if the client boots from the SAN, the client will be provided with location information necessary for communicating with the SAN properly, whereas this will not occur if the client boots locally (that is, without contacting the SAN). For example, if the client has booted locally, the client will still need to access the SAN (at least periodically) to determine if updated boot image files and/or meta data is available (as described further herein).

Moreover, if the user's client system does not have a NIC containing an iSCSI option ROM, there is not a method to boot iSCSI directly from a SAN. Standard replication practices are generally too expensive due to the limited resources available to BIOS at the time when the boot code is necessary.

A method is provided to synchronize the boot code (image) on the SAN with the boot code (image) stored locally. A method to replicate the boot code locally is thus provided. This solution solves multiple issues regarding iSCSI booting across the network. Embodiments having a local boot image allow for booting on systems without native iSCSI support (that is, without the local option ROM), avoidance of periodic longer boot times, and fail over mechanisms if the iSCSI boot server is not available.

Figure 8:
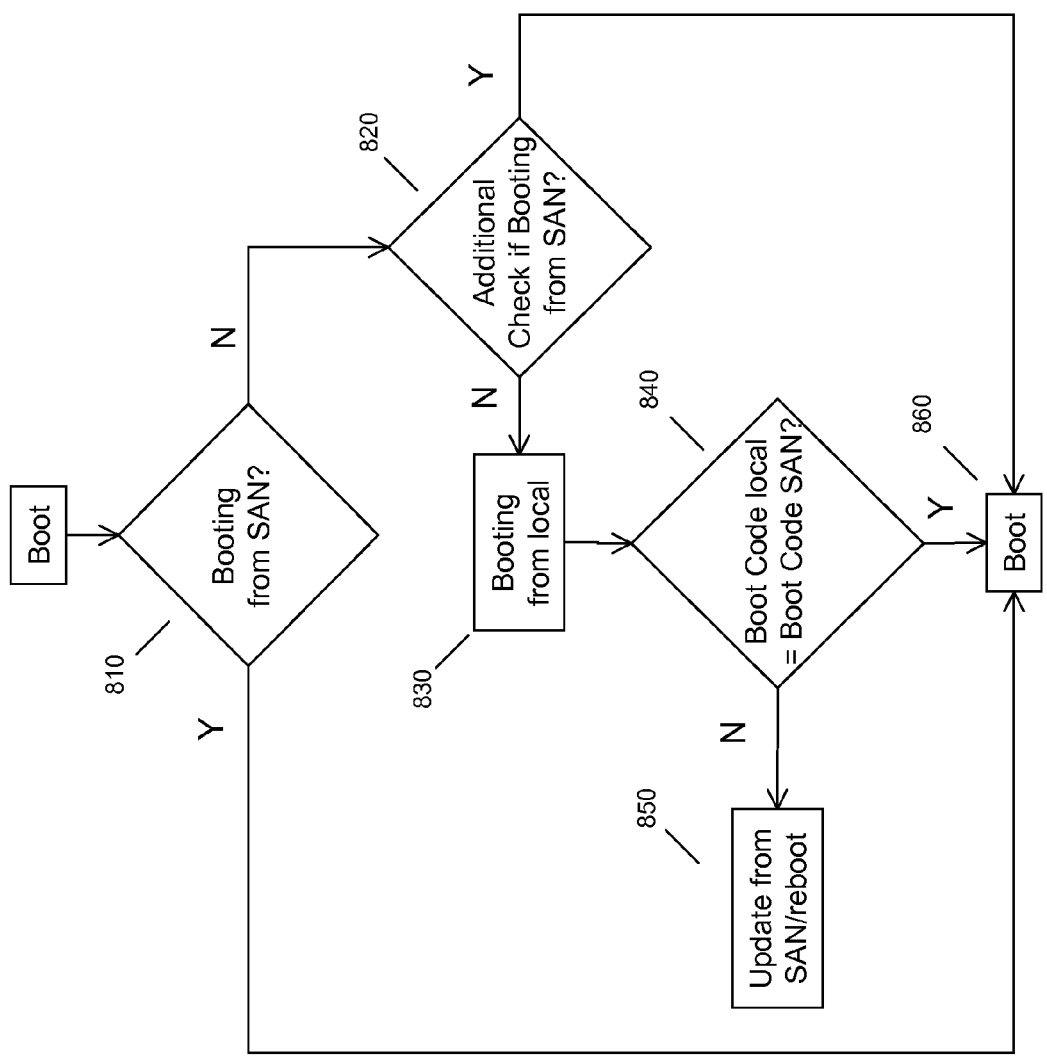
FIG. 8 illustrates an example of determining boot location, fix-up and data retrieval.

Turning to FIG. 8, at boot time, a method is provided that allows a determination of whether the client loaded boot code locally or loaded boot code remotely (via iSCSI from a SAN). This can be somewhat difficult to accomplish due to the fact that at this time in the boot process, the iSCSI disk typically presents itself to the client though a standard BIOS bootstrap mechanism (for example, as an INT 13h device), just like a local disk is presented.

To overcome this difficulty, the method checks to determine if the client has booted from the SAN 810. For example, code is executed to determine if there is iBFT (iSCSI Boot Firmware Table) data in the ACPI (Advanced Configuration and Power Interface) table. This provides information as to whether the client contacted a DHCP server and obtained SAN information. However, this initial check by itself may not be sufficient, since the NIC may have initialized iSCSI, even if the client has not booted from it. Accordingly, an additional check can be made to determine if the client booted from the SAN 820. For example, a check of the root path from the iBFT data to determine if an iSCSI SAN is available can be made. Then, a match of the local device with the root path, via the iSCSI database, is made to determine which drive (HDD) (/dev/sda, or /dev/sdb) has been used for booting. This then provides enough information regarding which device the client booted from (that is, if the client has booted locally or from a network attached device).

If the boot image was loaded from the SAN, the boot continues to the user's operating system 860. If the boot image was loaded from the local disk 830, there is a connection made to the SAN to get updated meta data (site configuration data) to determine if the local boot code is up to date. For example, a check is made if the hash value for the boot code on the local disk matches the hash value stored on the SAN 840. If these hash values do not match, the appropriate (updated) boot files are downloaded from the SAN to the local disk 850, and typically the client will be rebooted in order to ensure the user is always using the latest boot environment.

It will be understood by those having ordinary skill in the art that the embodiments can be implemented with electronic devices having appropriately configured circuitry, such as a desktop or laptop computer system, and the like. A non-limiting example of a computer system is described below.

The term "circuit" or "circuitry" as used herein includes all levels of available integration, for example, from discrete logic circuits to the highest level of circuit integration such as VLSI, and includes programmable logic components programmed to perform the functions of an embodiment as well as general-purpose or special-purpose processors programmed with instructions to perform those functions.

Figure 9:
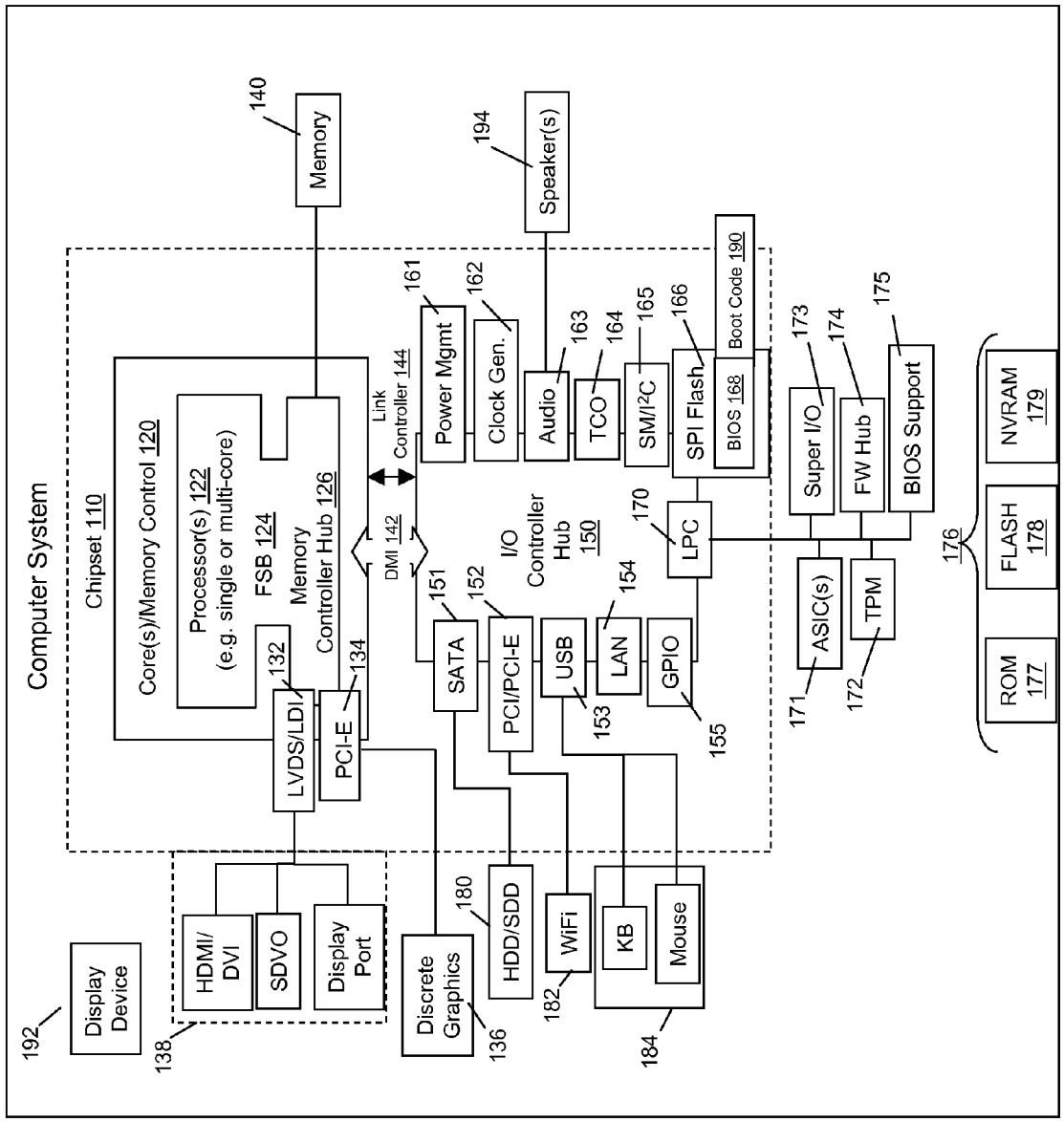
FIG. 9 illustrates a computer system.

While various other circuits or circuitry may be utilized, FIG. 9 depicts a block diagram of one example of a computer system and circuitry. The system may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system illustrated in FIG. 9.

The computer system of FIG. 9 includes a so-called chipset 110 (a group of integrated circuits, or chips, that work together, chipsets) with an architecture that may vary depending on manufacturer (for example, INTEL®, AMD®, etc.). The architecture of the chipset 110 includes a core and memory control group 120 and an I/O controller hub 150 that exchange information (for example, data, signals, commands, et cetera) via a direct management interface (DMI) 142 or a link controller 144. In FIG. 9, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 9, the memory controller hub 126 interfaces with memory 140 (for example, to provide support for a type of RAM that may be referred to as "system memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 9, the I/O hub controller 150 includes a SATA interface 151 (for example, for HDDs, SDDs, et cetera), a PCI-E interface 152 (for example, for wireless connections 182), a USB interface 153 (for example, for input devices 184 such as keyboard, mice, cameras, phones, storage, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 9.

Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those precise descriptions, and that various other changes and modifications may be affected therein by one skilled in the art without departing from the scope or spirit of the disclosure.

What is claimed is:

1. An apparatus comprising:
   one or more processors;
   a network interface configured to access over a network one or more of a base image and a user overlay image stored on a remote storage device; and
   a hard disk;
   wherein, responsive to execution of computer readable program code accessible to the one or more processors, the one or more processors are configured to:
   ascertain if the hard disk has been provisioned for use as a client local cache to store a base image;
   subsequent to a determination that the hard disk has been provisioned for use as a client local cache, download the base image including a user operating system from the remote storage device; and
   provide a guest operating system during download of the base image from the remote storage device.

2. The apparatus according to claim 1, wherein, responsive to execution of computer readable program code accessible to the one or more processors, the one or more processors are further configured to determine if the base image has been downloaded to the hard disk.

3. The apparatus according to claim 2, wherein, responsive to execution of computer readable program code accessible to the one or more processors, the one or more processors are further configured to, responsive to a determination that the base image has not been downloaded to the hard disk, access a guest operating system from the remote storage device.

4. The apparatus according to claim 3, wherein to download the base image from the remote storage device further comprises streaming down the base image as a background task while running the guest operating system from the remote storage device.

5. The apparatus according to claim 4, wherein the guest operating system comprises one or more of the base image and the user overlay image stored on the remote storage device.

6. The apparatus according to claim 1, wherein, responsive to execution of computer readable program code accessible to the one or more processors, the one or more processors are further configured to:
   suspend download of the base image from the remote storage device responsive to an interrupting event; and
   resume the download of the base image from the remote storage device in response to conclusion of the interrupting event.

7. The apparatus according to claim 1, wherein, responsive to execution of computer readable program code accessible to the one or more processors, the one or more processors are further configured to, responsive to a determination that the hard disk has not been provisioned for use as a client local cache, provision the hard disk for use as a client local cache and thereafter stream down the base image from the remote storage device.

8. The apparatus according to claim 1, wherein, responsive to execution of computer readable program code accessible to the one or more processors, the one or more processors are further configured to, subsequent to downloading the base image to the hard disk, utilize the client local cache copy of the base image.

9. The apparatus according to claim 8, wherein, responsive to execution of computer readable program code accessible to the one or more processors, the one or more processors are further configured to ascertain if one or more updates to the base image stored on the remote storage device are available and apply the one or more updates to the client local cache copy of the base image.

10. A method comprising:
    in an apparatus configured to access one or more of a base image and a user overlay image stored on a remote storage device, ascertaining if a hard disk of the apparatus has been provisioned for use as a client local cache to store a base image;
    subsequent to a determination that the hard disk has been provisioned for use as a client local cache, downloading a base image including a user operating system from the remote storage device; and
    providing a guest operating system during download of the base image from the remote storage device.

11. The method according to claim 10, further comprising determining if the base image has been downloaded to the hard disk.

12. The method according to claim 11, further comprising, responsive to a determination that the base image has not been downloaded to the hard disk, accessing a guest operating system from the remote storage device.

13. The method according to claim 12, wherein downloading the base image from the remote storage device further comprises streaming down the base image as a background task while running the guest operating system from the remote storage device.

14. The method according to claim 13, wherein the guest operating system comprises one or more of the base image and the user overlay image stored on the remote storage device.

15. The method according to claim 10, further comprising:
    suspending download of the base image from the remote storage device responsive to an interrupting event; and
    resuming the download of the base image from the remote storage device in response to conclusion of the interrupting event.

16. The method according to claim 10, further comprising, responsive to a determination that the hard disk has not been provisioned for use as a client local cache, provisioning the hard disk for use as a client local cache and thereafter streaming down the base image from the remote storage device.

17. The method according to claim 10, further comprising, subsequent to downloading the base image to the hard disk, utilizing the client local cache copy of the base image.

18. The method according to claim 17, further comprising:
   ascertaining if one or more updates to the base image stored on the remote storage device are available; and
   in response to determining one or more updates to the base image are available, applying the one or more updates to the client local cache copy of the base image.

19. A computer program product comprising:
   a computer readable storage (medium) device having a program of instructions embodied therewith for permitting an apparatus to access one or more of a base image and a user overlay image stored on a remote storage device, the program of instructions further comprising:
   computer readable program code configured to ascertain if a hard disk of the apparatus has been provisioned for use as a client local cache to store a base image; and
   computer readable program code configured to, subsequent to a determination that the hard disk has been provisioned for use as a client local cache, download a base image including a user operating system from the remote storage device: and
   computer readable program code configured to provide a guest operating system during download of the base image from the remote storage device.

20. The computer program product according to claim 19, wherein the program of instructions further comprise computer readable program code configured to, responsive to a determination that the hard disk has not been provisioned for use as a client local cache, provision the hard disk for use as a client local cache and thereafter stream down the base image from the remote storage device.

* * * * *